Feb. 11, 1958 L. W. BANTA 2,823,046
SAFETY BELT SYSTEM FOR VEHICLES
Filed Oct. 18, 1955 2 Sheets-Sheet 1
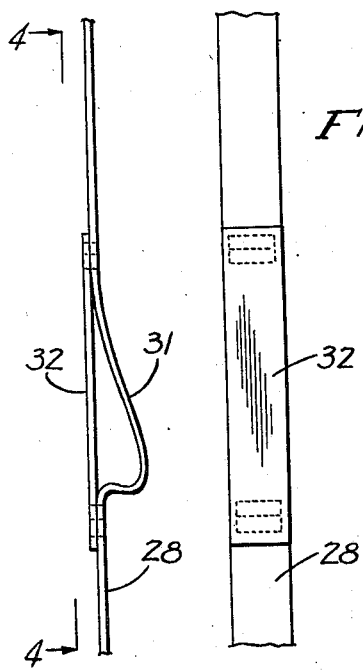
FIG. 3
FIG. 4
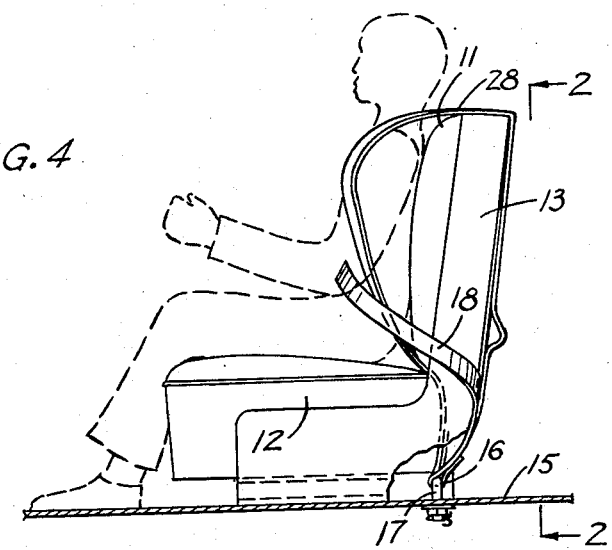
FIG. 1
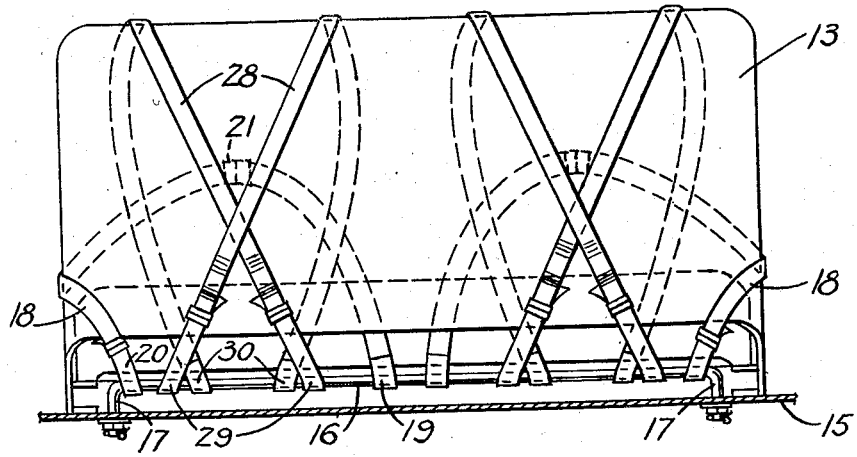
FIG. 2
INVENTOR.
LARRY W. BANTA
BY
McMorrow, Berman + Davidson
ATTORNEYS Feb. 11, 1958 L. W. BANTA 2,823,046
SAFETY BELT SYSTEM FOR VEHICLES
Filed Oct. 18, 1955 2 Sheets-Sheet 2

INVENTOR.
LARRY W. BANTA
BY
McMorrow, Berman + Davidson
ATTORNEYS

United States Patent Office 2,823,046
Patented Feb. 11, 1958

2,823,046

SAFETY BELT SYSTEM FOR VEHICLES

Larry W. Banta, La Porte, Tex.

Application October 18, 1955, Serial No. 541,122

5 Claims. (Cl. 280—150)

This invention relates to vehicles, and more particularly to improvements in safety belt structures for vehicle seats.

A main object of the invention is to provide a novel and improved safety belt system for a vehicle seat, such system involving relatively simple components, being easy to install, and providing greatly improved passenger safety in the vehicle equipped therewith.

A further object of the invention is to provide an improved safety belt structure for a vehicle seat, said structure involving relatively inexpensive components, being arranged so as not to interfere with the comfort of the passengers employing same, and providing improved protection for the passengers of the vehicle equipped with the safety belt devices of the present invention against injury from collisions, or other emergency conditions.

Further objects and advantages of the invention will become apparent from the following description and claims, and from the accompanying drawings, wherein:

Figure 1 is a vertical cross sectional view taken longitudinally through a portion of a vehicle equipped with an improved safety belt arrangement on a seat thereof, in accordance with the present invention.

Figure 2 is a vertical cross sectional view taken on the line 2—2 of Figure 1.

Figure 3 is an enlarged fragmentary side elevational view of the elastic portion of one of the shoulder straps employed in the safety belt arrangement of Figure 1.

Figure 4 is a front elevational detail view taken on the line 4—4 of Figure 3.

Figure 5:
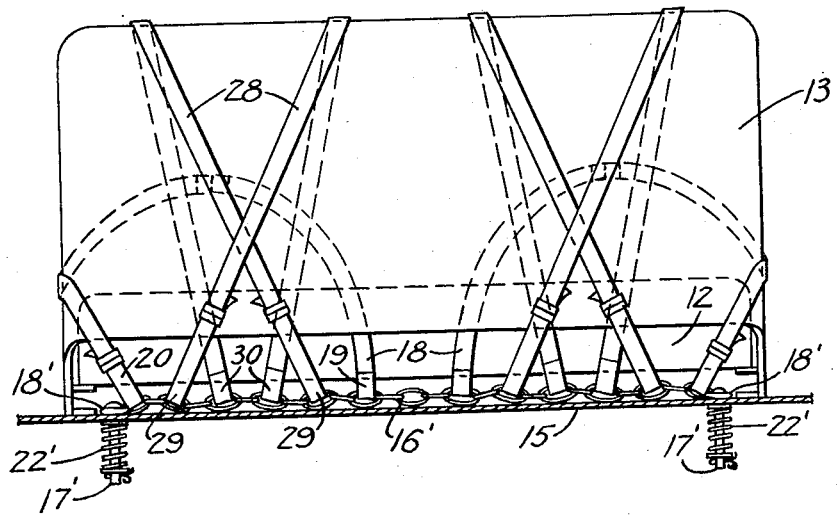
Figure 5 is a transverse vertical cross sectional view, similar to Figure 2, but showing a modified form of safety belt arrangement according to the present invention.

Referring to the drawings, and more particularly to Figures 1 to 4, 11 generally designates a conventional vehicle seat having a substantially horizontal cushioned support portion 12 and an upstanding back rest portion 13 at the rear margin of the support portion 12. Secured transversely to the floor 15 of the vehicle beneath and parallel to the rear margin of the horizontal support portion 12 is a bar member 16, said bar member being provided with the depending vertical end portions 17, 17 which extend through and which are suitably secured rigidly to the floor 15, supporting the main portion of the bar 16 parallel to and above the floor 15, as is clearly shown in Figure 2.

Designated respectively at 18, 18 are flexible strap members formed at their ends with loops 19 and 20 which are engaged on and around the horizontal main portion of the bar 16, the straps extending between the bottom edge of the back rest portion 13 and the rear marginal portion of the horizontal support 12, whereby the strap members are adapted to engage around the body of a person on the seat in the manner illustrated in Figure 1. The strap members 18 thus are adapted to encircle the waist of the person, as illustrated. Said strap members 18 are provided with suitable quick-releasing buckle members 21, whereby each strap member 18 may be adjusted to comfortably engage around the waist of the person using the same.

Figure 7:
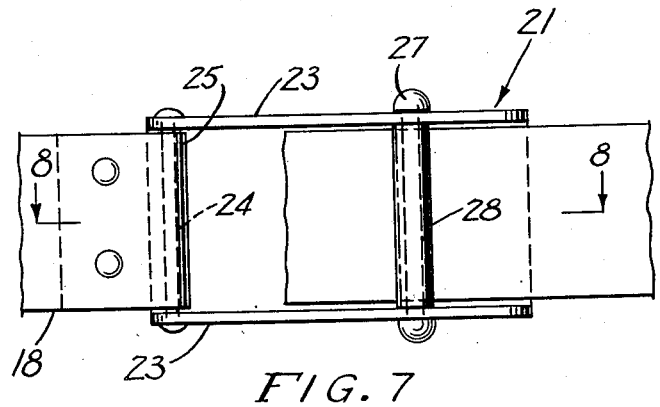
Figure 7 is an enlarged fragmentary front elevational view of one of the quick-releasing buckles employed on the waist-encircling strap members of the safety belt arrangement of Figures 1 to 5.
Figure 8:
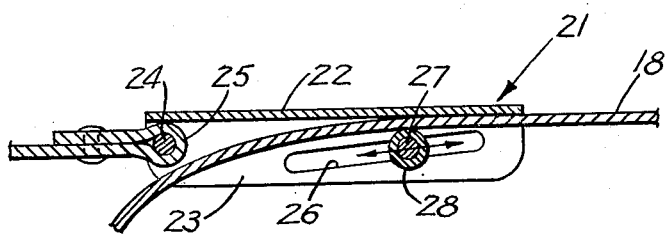
Figure 8 is a cross sectional view taken on the line 8—8 of Figure 7.

As shown in Figures 7 and 8, each buckle 21 comprises a rectangular main body 22 formed with parallel longitudinal side flanges 23, 23, a transverse pin element 24 being secured through the end portions of the side flanges 23, 23 and providing anchorage for the loop 25 on the end of one of the strap segments comprising the straps 18. At the opposite end portion of main body 22, the flanges 23 are formed with inclined slots 26 which are parallel to each other, said slots being inclined in the manner illustrated in Figure 8 and slidably receiving a transverse pin 27 provided on its inner portion with a locking sleeve 28. The remaining segment of the belt 18 is received between the locking sleeve 28 and the main body 22 of the buckle, as shown in Figure 8, whereby said remaining segment may be clamped by moving the pin 27 away from the loop 25. To unclamp the belt segment, the pin 27 is moved in a direction toward the belt loop 25, whereby the clamping force is relieved, allowing the belt to be unfastened.

Designated respectively at 28, 28 are respective pairs of additional flexible straps which are provided at their ends with respective loops 29 and 30, said loops being engaged around the anchor bar 16, and the straps extending around and over the top edge of the back rest portion 13 of the seat. As shown, the rear portions of the flexible straps 28 are crossed adjacent the rear side of the back rest portion 13, defining respective straps for engaging around the respective shoulders of the person using the seat.

The straps 18 and 28 are fabricated of relatively inelastic material, such as leather or the like. To provide a desired degree of elasticity in the shoulder straps 28, each shoulder strap is formed at its rear portion with a loop element 31, the end portions of the loop element 31 being connected by a strip of elastic rubber-like material 32, as shown in Figures 3 and 4, allowing limited stretching of the strap members 28.

The strap members 18 and 28, as above explained, may be formed of any suitable flexible, relatively inelastic material, such as leather, canvas web material, or the like.

The loops 19, 20, 29 and 30 are slidably engaged on the bar 16, whereby said loops readily adjust themselves to positions in accordance with the size and shape of the body of the person using the straps. As above explained, the waist-encircling strap member 18 is adjustable by means of the buckle member 21 provided thereon. The shoulder straps 28, 28 are sufficiently elastic, by the provision of the elastic strips 32 at their rear portions, to be comfortably adjustable on the shoulders of the person using the straps.

Figure 6:
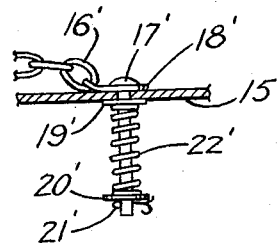
Figure 6 is an enlarged vertical cross sectional detail view taken through one of the resilient fastening elements employed to yieldably secure an end of the transverse belt-anchoring chain employed in the form of the invention illustrated in Figure 5.

In the form of the invention illustrated in Figures 5 and 6, a transversely extending chain 16' is employed in place of the transverse bar 16 of the previously described form of the invention, the ends of the chain 16' being fastened to the floor 15 by means of fastening bolts 17' extending through the floor, the ends of the bolts 17' engaging the apertured anchor elements 18' connected to the ends of chain 16', as shown in Figure 6. The shank of each bolt 17' has a washer 19' engaged thereon immediately subjacent the floor 15 and is provided with an additional washer 20' supported on the lower end portion of the shank by a cotter pin 21' passing through the shank. A coiled spring 22' surrounds the shank between the washers 19' and 20', biasing the head portion of bolt 17' downwardly.

The respective loops 19, 20, 29 and 30 of the strap members 18 and 28, 28 of each set of safety straps are engaged with spaced links of chain 16', in the manner clearly shown in Figure 5, whereby the strap loops 19, 20, 29 and 30 are secured to chain 16'. Since the ends of the chain are yieldable, by the provision of the coiled springs 22' on the shanks of the bolts 17', the straps are yieldably held and provide a resilient yielding action, enabling the straps to be comfortably fitted on the body of the person using same and providing a shock absorbing action, whereby impact or other emergency vehicle conditions allow a limited amount of yielding of the straps to prevent discomfort or injury to the person employing the safety straps.

In the previously described form of the invention, the elastic strip elements 32 provide a similar degree of yielding action, and a further degree of yielding action is provided by the sliding engagement of the strap loops 19, 20, 29 and 30 with the anchor rod 16.

While certain specific embodiments of an improved safety strap system for a vehicle seat have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a vehicle, a seat comprising a substantially horizontal support portion, an upstanding back rest portion at the rear margin of said support portion, an anchoring member secured transversely to the floor of the vehicle beneath and parallel to the rear margin of said support portion and being substantially coextensive therewith, a first flexible strap member secured at its ends to said transversely extending anchoring member and extending between the bottom edge of said back rest portion and the rear margin of said support portion, said first strap member being adapted to engage around the body of a person on the seat, and a pair of additional flexible strap members secured at their ends to said transversely extending anchoring member and extending around and over the top edge of said back rest portion, said last-named strap members being adapted to engage over the person's shoulders.

2. In a vehicle, a seat comprising a substantially horizontal support portion, an upstanding back rest portion at the rear margin of said support portion, an anchoring member secured transversely to the floor of the vehicle beneath and parallel to the rear margin of said support portion and being substantially coextensive therewith, a first flexible strap member secured at its ends to said transversely extending anchoring member and extending between the bottom edge of said back rest portion and the rear margin of said support portion, said first strap member being adapted to engage around the body of a person on the seat, and a pair of additional flexible strap members secured at their ends to said transversely extending anchoring member and extending around and over the top edge of said back rest portion, said last-named strap members being adapted to engage over the person's shoulders, each of said last-named strap members including an elastic portion formed and arranged to allow limited stretching of said last-named strap members.

3. In a vehicle, a seat comprising a substantially horizontal support portion, an upstanding back rest portion at the rear margin of said support portion, an anchoring member secured transversely to the floor of the vehicle beneath and parallel to the rear margin of said support portion and being substantially coextensive therewith, a first flexible, substantially inelastic strap member secured at its ends to said transversely extending anchoring member and extending between the bottom edge of said back rest portion and the rear margin of said support portion, said first strap member being adapted to engage around the body of a person on the seat and being provided with buckle means for adjusting its tightness, a pair of additional flexible strap members secured at their ends to said transversely extending anchoring member and extending around and over the top tdge of said back rest portion, said last-named strap members being adapted to engage over the person's shoulders, said last-named strap members being crossed at the rear side of said back rest portion, each of said last-named strap members being formed of substantially inelastic material and being formed with a loop, and a strip of elastic rubber-like material secured across each loop, allowing limited stretching of said last-named strap members.

4. In a vehicle, a seat comprising a substantially horizontal support portion, an upstanding back rest portion at the rear margin of said support portion, an anchoring bar secured transversely to the floor of the vehicle beneath and parallel to the rear margin of said support portion and being substantially coextensive therewith, a first flexible strap member secured at its ends to said transversely extending anchoring bar and extending between the bottom edge of said back rest portion and the rear margin of said support portion, said first strap member being adapted to engage around the body of a person on the seat, and a pair of additional flexible strap members secured at their ends to said transversely extending anchoring bar and extending around and over the top edge of said back rest portion, said last-named strap members being adapted to engage over the person's shoulders.

5. In a vehicle, a seat comprising a substantially horizontal support portion, an upstanding back rest portion at the rear margin of said support portion, an anchoring chain resiliently secured to the floor of the vehicle beneath and parallel to the rear margin of said support portion and being substantially coextensive therewith, a first flexible strap member secured at its ends to said transversely extending anchoring chain and extending between the bottom edge of said back rest portion and the rear margin of said support portion, said first strap member being adapted to engage around the body of a person on the seat, and a pair of additional flexible strap members secured at their ends to said transversely extending anchoring chain and extending around and over the top edge of said back rest portion, said last-named strap members being adapted to engage over the person's shoulders.

References Cited in the file of this patent

UNITED STATES PATENTS

| 2,365,625 | Carlisle | Dec. 19, 1944 |
| 2,576,867 | Wilson | Nov. 27, 1951 |
| 2,634,802 | Stumm | Apr. 14, 1953 |

FOREIGN PATENTS

| 1,068,761 | France | Feb. 10, 1954 |

OTHER REFERENCES

Howe: Article on "Safety Belts" from Ford Field (periodical), vol. 56, No. 9, September 1954, pages 16 and 34.